(12) United States Patent
Wei

(10) Patent No.: US 10,988,411 B2
(45) Date of Patent: Apr. 27, 2021

(54) METHOD AND APPARATUS FOR DRYING AND COOLING GLASS SUBSTRATE

(71) Applicant: Wuhan China Star Optoelectronics Technology Co., Ltd., Hubei (CN)

(72) Inventor: Fan Wei, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 118 days.

(21) Appl. No.: 15/740,941

(22) PCT Filed: Nov. 1, 2017

(86) PCT No.: PCT/CN2017/108852
§ 371 (c)(1),
(2) Date: Oct. 18, 2018

(87) PCT Pub. No.: WO2019/080151
PCT Pub. Date: May 2, 2019

(65) Prior Publication Data
US 2019/0119156 A1  Apr. 25, 2019

(30) Foreign Application Priority Data
Oct. 25, 2017 (CN) .......................... 201711008421.9

(51) Int. Cl.
*C03B 32/00* (2006.01)
*C03C 23/00* (2006.01)
(Continued)

(52) U.S. Cl.
CPC .......... *C03C 23/0075* (2013.01); *C03B 32/00* (2013.01); *C03B 35/16* (2013.01);
(Continued)

(58) Field of Classification Search
CPC .... C03B 23/007; C03B 25/08; C03B 2218/31
See application file for complete search history.

(56) References Cited

U.S. PATENT DOCUMENTS 4,749,586 A * 6/1988 Bravet ................. B05B 3/1057
264/212
5,236,488 A * 8/1993 Vehmas ................ C03B 27/016
65/114
(Continued)

FOREIGN PATENT DOCUMENTS

CN        201936121       8/2011

*Primary Examiner* — Cynthia Szewczyk
(74) *Attorney, Agent, or Firm* — Hemisphere Law, PLLC; Zhigang Ma

(57) ABSTRACT

The invention discloses a method and an apparatus for drying and cooling a glass substrate. The method comprises the steps described below. The method delivers the glass substrate cleaned by a cleaner into a baking oven by a first roller device. It dries the glass substrate using an infrared heating plate installed in the baking oven. It delivers the dried glass substrate into a cooling chamber by a second roller device. It cools the dried glass substrate using a cooling plate installed in the cooling chamber. And it delivers the cooled glass substrate onto a platform of an air floating type coater, and coating the glass substrate. This invention also discloses an apparatus corresponding to the method. According to the embodiments of the present invention, it is possible to reduce the number of foreign particles on the glass substrate before coating, and the drying effect is excellent.

8 Claims, 3 Drawing Sheets

(51) Int. Cl.
*C03C 17/00* (2006.01)
*C03B 35/24* (2006.01)
*C03B 35/16* (2006.01)

(52) U.S. Cl.
CPC ............ *C03B 35/24* (2013.01); *C03C 17/002* (2013.01); *C03C 23/001* (2013.01); *C03C 23/007* (2013.01)

(56) References Cited

U.S. PATENT DOCUMENTS

2009/0151855 A1* 6/2009 Wang ..................... C03C 27/06
　　　　　　　　　　　　　　　　　　　156/109
2014/0166472 A1* 6/2014 Ding ................... C03C 17/3644
　　　　　　　　　　　　　　　　　　　204/192.26

* cited by examiner

METHOD AND APPARATUS FOR DRYING AND COOLING GLASS SUBSTRATE

RELATED APPLICATIONS

The present application is a National Phase of International Application Number PCT/CN2017/108852, filed Nov. 1, 2017, and claims the priority of China Application No. 201711008421.9, filed Oct. 25, 2017.

FIELD OF THE DISCLOSURE

The disclosure relates to the technical field of displays, and especially particularly to a method and an apparatus for drying and cooling a glass substrate.

BACKGROUND

In the procedure of manufacturing the liquid crystal display panel, further in the exposure process of the array substrate (TFT side), the glass substrate needs to be cleaned by a cleaner before coating. Then the glass substrate will be dehydration baked (DB) and cooled before proceeding with the coating procedure. After the coater (e.g. photoresist) is coated in the coating procedure, a pre-bake procedure is performed. And then the glass substrate is delivered into an exposure. A mask is used on the glass substrate for photoresist corresponding to the predetermined pattern. Then the corresponding pattern is formed by the developer. As a result, the TFT substrate exposure procedure will be completed.

In order to reduce coating defects in the coating procedure, it is necessary to use a cleaner to perform cleaning before coating procedure in the prior art. In this regard, the skill mainly be divided into the following steps:

It uses Extremely-Violet (EUV) to decompose the organics on the substrate surface, and at the same time uses ozone to accelerate the decomposition of organics. It neutralizes the acidic on the surface of the substrate using Tetramethylammonium Hydroxide (TMAH). Then use brush (RB) and AAJEDT to clean for removing the foreign particles on both sides of glass substrate. After the substrate is cleaned, an air knife (A/K) is used to blow the upper and lower surfaces of the substrate to remove the residual moisture. After the glass substrate is cleaned and dried, the glass substrate is transferred by a robotic arm to a Dehydration Baking (DB) apparatus before coating procedure to bake, dry and cool the glass substrate. Further, it is necessary to use a robotic arm to move the cooled glass substrate into a coater.

However, the traditional technology has the following defects: Firstly, the operating stroke is larger for the robotic arm to clean. Therefore, there will be more foreign particles in the environment around the robotic arm. Furthermore, the floor where the robotic arm is mounted is a raised floor. During the operation of the robotic arm, the airflow generated by the moving robotic arm brings the foreign particles under the floor into the working space of the robotic arm. In addition, there are hot plates (HP) and cold plates (CP) in existing baking, drying and cooling equipment. When the glass substrate is fed into or sent out of the equipment, the foreign particles in the working space of the robotic arm fall on the hot plate and the cold plate. Therefore, when the glass substrate is heated or cooled in a stationary state, the foreign particles adhere to the surface of the glass substrate. In the prior art, there is a technique that uses an air floating type coater (Levi coater) instead of the linear coater. Whereby, it is possible to reduce the use of robotic arm once before coating. That is it does not require the robotic arm to move the cooled glass substrate into the coater. However, it is also necessary to use the robot arm once before coating. That is the process of moving the glass substrate into the baking equipment. During the operation of the robotic arm and the process of baking the glass substrate in stationary state, there is still a problem concerning the foreign particles adsorbing on the surface of the glass substrate.

In addition, in order to reduce the poor coating yield due to the attachment of foreign particles, some of the existing technologies do not use the dehydration baking apparatus, and instead use only the air knife. But in fact, the air knife cannot completely remove moisture from the substrate. If there is moisture on the surface of the substrate, photoresist peeling may occur during the procedure of photoresist coating.

SUMMARY

The efficacy to be achieved by the present invention is to invent a method and an apparatus for drying and cooling a glass substrate. The method and the apparatus can reduce the amount of foreign particles on the glass substrate before coating procedure. In addition, the method and the apparatus can dry with excellent results.

In order to solve the above technical problems above described, the embodiments of the present invention provide a method for drying and cooling a glass substrate. The method comprises following steps:

The method delivers the glass substrate cleaned by a cleaner into a baking oven by a first roller device;

The method bakes the glass substrate using an infrared heating plate installed in the baking oven;

The method delivers the dried glass substrate into a cooling chamber by a second roller device;

The method cools the dried glass substrate using a cooling plate installed in the cooling chamber;

The method delivers the cooled glass substrate onto a platform of an air floating type coater, and coating the glass substrate.

Among them, the step of baking the glass substrate using an infrared heating plate installed in the baking oven specifically means:

While the glass substrate is moved on the first roller device at a predetermined speed. The method bakes the glass substrate using the infrared heating plates installed at the top and/or bottom of the baking oven.

Wherein, the step of cooling the dried glass substrate using a cooling plate installed in the cooling chamber specifically means:

While the glass substrate is moved on the second roller device at a predetermined speed. The method cools the dried glass substrate using the cooling plates installed at the top and/or bottom of the cooling chamber.

Accordingly, in another aspect of the embodiments of the present invention, there is further provided an apparatus for drying and cooling the glass substrate. The apparatus comprises a baking oven and a cooling chamber arranged side by side.

A first roller device is installed on the bottom plate of the baking oven. The first roller device is used for moving the glass substrate cleaned by a cleaner in the baking oven.

A second roller device is installed on the bottom plate of the cooling chamber. The second roller device is used for moving the glass substrate dried by the baking oven in the cooling chamber.

A plurality of infrared heating plates are installed at inside of the top plate of the baking oven.

A plurality of cooling plates are installed at inside of the top plate of the cooling chamber.

Wherein, the infrared heating plate is further installed on the bottom plate of the baking oven. The cooling plate is further installed on the bottom plate of the cooling chamber.

Wherein, a passing channel for the glass substrate to pass through is respectively disposed in the baking oven beside of the cleaner, between the baking oven and the cooling chamber, and in the cooling chamber beside a coater.

Wherein, the surface of the first roller device, the surface of the second roller device, and the platform surface of the coater are at the same level.

Wherein, both the top plate of the baking oven and the top plate of the cooling chamber are movable.

Accordingly, in further aspect of the embodiments of the present invention, there is further provided an apparatus for drying and cooling the glass substrate. The apparatus comprises a baking oven and a cooling chamber arranged side by side.

A first roller device is installed on the bottom plate of the baking oven. The first roller device is used for moving the glass substrate cleaned by a cleaner in the baking oven.

A second roller device is installed on the bottom plate of the cooling chamber. The second roller device is used for moving the glass substrate dried by the baking oven in the cooling chamber.

A plurality of infrared heating plates are installed at inside of the top plate of the baking oven.

A plurality of cooling plates are installed at inside of the top plate of the cooling chamber.

Wherein, the surface of the first roller device, the surface of the second roller device, and the platform surface of a coater are at the same level.

In an embodiment, the infrared heating plate is further installed on the bottom plate of the baking oven. The cooling plate is further installed on the bottom plate of the cooling chamber.

Wherein, a passing channel for the glass substrate to pass through is respectively disposed in the baking oven beside of the cleaner, between the baking oven and the cooling chamber, and in the cooling chamber beside a coater.

In an embodiment, both the top plate of the baking oven and the top plate of the cooling chamber are movable.

The implementation of the embodiments of the present invention has the following beneficial effects:

The embodiments of the present invention provide the method and the apparatus for drying and cooling the glass substrate. The method and the apparatus use the infrared heating plate baking the glass substrate to dry. And the method and the apparatus use the air floating type coater to perform the coating procedure. The roller devices are disposed in the baking oven and the cooling chamber respectively. Therefore, there is no need to use a robotic arm in the process of delivering the glass substrate. Thereby makes it possible to reduce the space of the baking oven and the cooling chamber, and to reduce or avoid the amount of foreign particles brought in from the external space.

Moreover, the glass substrate can be heated and cooled during conveyance of the glass substrate only by controlling the conveying speed of the roller device. There is no need to heat and cool in a stationary state as in the prior art. Therefore, the amount of foreign particles falling on the surface of the glass substrate before the coating procedure can be further reduced, and the coating yield of the glass substrate can be further improved.

BRIEF DESCRIPTION OF THE DRAWINGS

In order to more clearly disclose the embodiments or the technical solutions of the present invention, the following drawings, which are to be used in the description of the embodiments or the technical solutions, will be briefly described. Apparently, the drawings in the description below are merely some embodiments of the disclosure, a person skilled in the art can obtain other drawings according to these drawings without creative efforts.

DETAILED DESCRIPTION OF PREFERRED EMBODIMENTS

Figure 1:
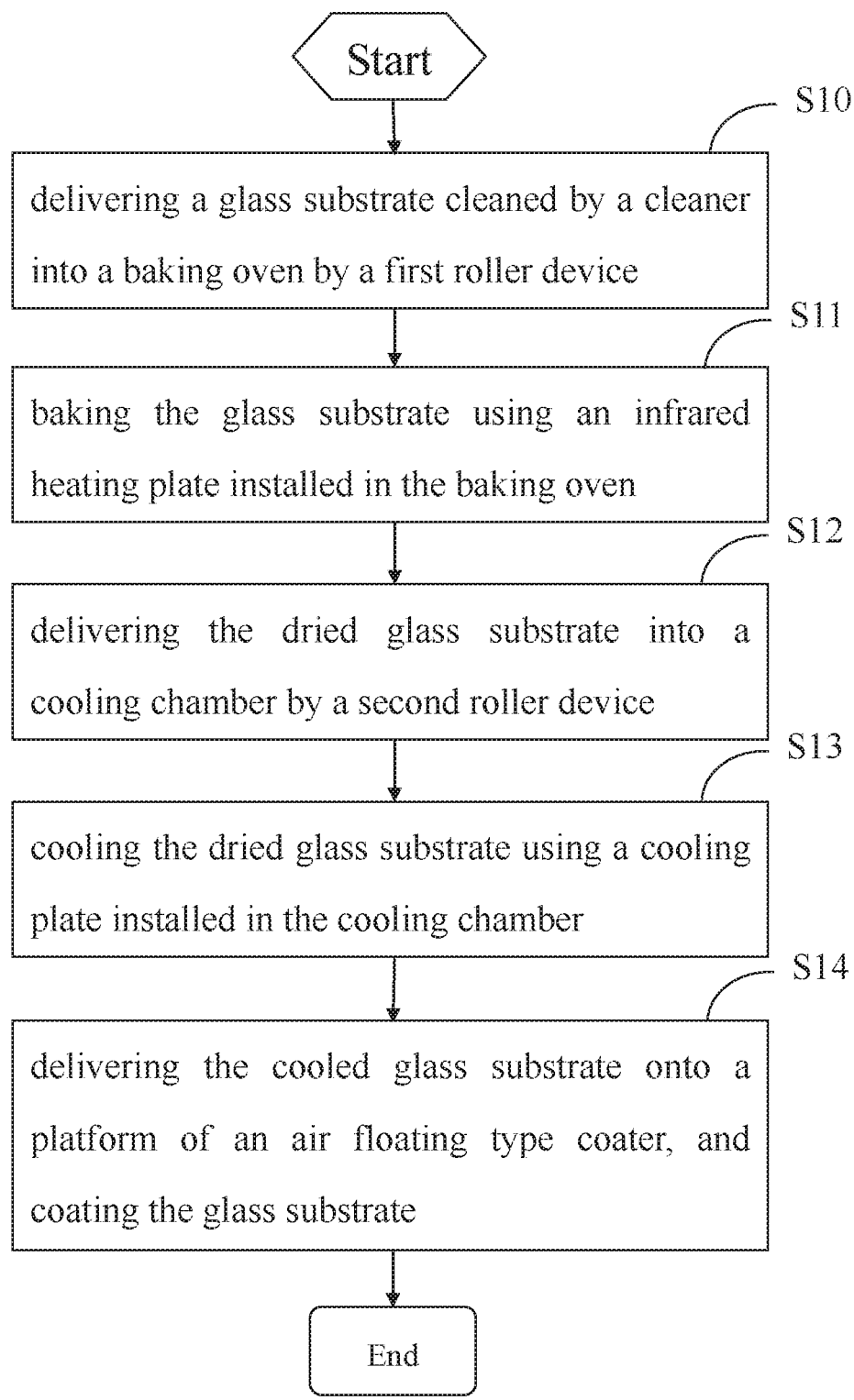
FIG. 1 is a schematic flow chart of an embodiment of the method for drying and cooling the glass substrate according to the present invention.

The disclosure will be further described in detail with reference to accompanying drawings and preferred embodiments as follows. The specific structural and functional details disclosed herein are only representative and are intended for describing exemplary embodiments of the disclosure. However, the disclosure can be embodied in many forms of substitution, and should not be interpreted as merely limited to the embodiments described herein. All other embodiments obtained by persons of ordinary skill in the art based on the embodiments of the present invention without creative efforts shall fall within the protection scope of the present invention.

It should also be noted that in order to avoid obscuring the present invention by unnecessary details. Only the structures and/or processing steps that are closely related to the present invention are shown in the drawings. Therefore, other details that have little to do with the present invention will be omitted.

As shown in FIG. 1, the main flow chart of an embodiment of a method for drying and cooling a glass substrate provided by the present invention is shown. In said embodiment, the method comprises the steps of:

Step 10: The method delivers the glass substrate cleaned by a cleaner into a baking oven by a first roller device.

Step 11: The method bakes the glass substrate using an infrared heating plate installed in the baking oven. In an embodiment, this step is specifically as follows:

While the glass substrate is moved on the first roller device at a predetermined speed. The method bakes the glass substrate using the infrared heating plates installed at the top and/or bottom of the baking oven.

Step 12: The method delivers the dried glass substrate into a cooling chamber by a second roller device.

Step 13: The method cools the dried glass substrate using a cooling plate installed in the cooling chamber. In an embodiment, this step is specifically as follows:

While the glass substrate is moved on the second roller device at a predetermined speed. The method cools the dried glass substrate using the cooling plates installed at the top and/or bottom of the cooling chamber. The temperature of the glass substrate needs to be controlled to the required temperature (for example, 23° C.).

Step 14: The method delivers the cooled glass substrate onto a platform of an air floating type coater, and processes the coating procedure to the glass substrate.

Figure 2:
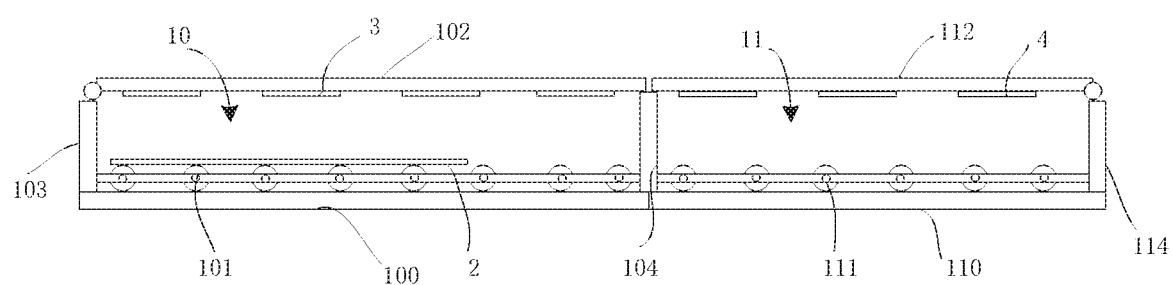
FIG. 2 is a structural schematic side view of an embodiment of the apparatus for drying and cooling the glass substrate according to the present invention.

As shown in FIG. 2, a structural schematic side view of an embodiment of an apparatus for drying and cooling the glass substrate according to the present invention is shown. Please also refer to FIG. 3 and FIG. 4 together. In this embodiment, the apparatus comprises a baking oven 10 and a cooling chamber 11 arranged side by side.

A first roller device 101 is installed on the bottom plate 100 of the baking oven 10 for moving the glass substrate 2 cleaned by a cleaner in the baking oven 10.

A second roller device 111 is installed on the bottom plate 110 of the cooling chamber 11 for moving the glass substrate dried by the baking oven 10 in the cooling chamber 11.

Specifically, a plurality of infrared heating plates 3 are installed at inside of the top plate 102 of the baking oven 10. After the infrared heating plate 3 is powered on, to heat the resistance may generate heat radiation such as infrared rays to bake and dry the glass substrate.

A plurality of cooling plates 4 are installed at inside of the top plate 112 of the cooling chamber 11. The cooling plate 4 can cool the cooling chamber 11 by the way of heat radiation.

Figure 3:
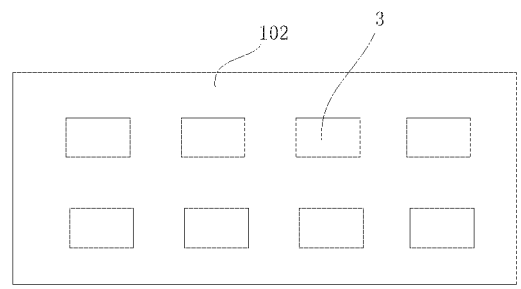
FIG. 3 is a schematic diagram of the infrared heating plate installed on the top plate of the baking oven in FIG. 2.

It can be reasonably understood that the number and arrangement of the infrared heating plate 3 or the cooling plate 4 can be adjusted correspondingly according to the actual size of the baking oven or the cooling chamber. As shown in FIG. 3, the top plate with ten infrared heating plates is shown.

Specifically, a passing channel for the glass substrate 2 to pass through is respectively disposed at the side 103 of the baking oven 10 nearing the cleaner, in the position 104 between the baking oven 10 and the cooling chamber 11, and at the side 114 of the cooling chamber 11 nearing the coater.

Figure 4:
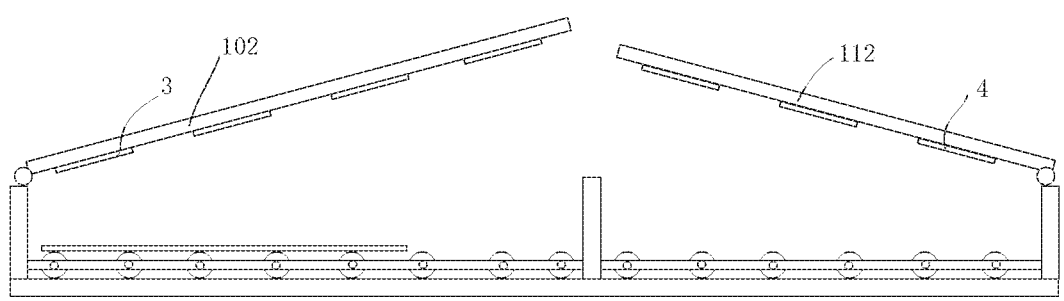
FIG. 4 is a structural schematic view of the opening top plate in FIG. 2.

In an embodiment, both the top plate 102 of the baking oven 10 and the top plate 112 of the cooling chamber 11 are movable. Both the top plates 102 112 can be opened upwards. The effect of which is shown in FIG. 4.

However, it is also reasonable that in other embodiments, the top plate 102 of the baking oven 10 and the top plate 112 of the cooling chamber 11 may also be fixed.

It is also reasonable that the surface of the first roller device 101, the surface of the second roller device 111, the outlet of the cleaner, and the platform surface of the coater are at the same level. Therefore, the glass substrate can be moved from the cleaner into the baking oven and the cooling chamber without a robotic arm. Also, the glass substrate can be moved from the cooling chamber to the platform of the air floating type coater without the robotic arm.

Figure 5:
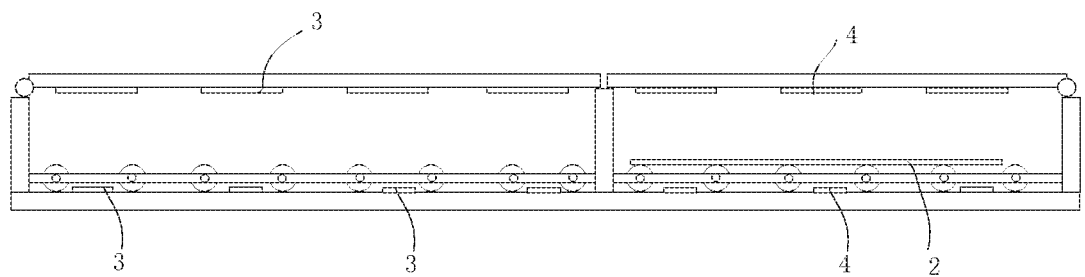
FIG. 5 is a structural schematic side view of another embodiment of the apparatus for drying and cooling the glass substrate according to the present invention.

As shown in FIG. 5, a side view structural diagram of another embodiment of the apparatus for drying and cooling a glass substrate provided by the present invention may be shown in the figure. In this embodiment, the difference from FIG. 2 lies in that a plurality of infrared heating plate 3 are further disposed on the bottom plate 100 of the baking oven 10. And a plurality of cooling plates 4 are disposed on the bottom plate 110 of the cooling chamber 11. In this way, the drying performance of the baking oven can be improved and the cooling performance of the cooling chamber also can be improved. Other structures and principles are the same as those shown in FIG. 2, which will not be repeated here.

The implementation of the embodiments of the present invention has the following beneficial effects:

The embodiments of the present invention provide the method and the apparatus for drying and cooling the glass substrate. The method and the apparatus use the infrared heating plate baking the glass substrate to dry, And the method and the apparatus use the air floating type coater to perform the coating procedure. The roller devices are disposed in the baking oven and the cooling chamber respectively. Therefore, there is no need to use a robotic arm in the process of delivering the glass substrate. Thereby makes it possible to reduce the space of the baking oven and the cooling chamber, and to reduce or avoid the amount of foreign particles brought in from the external space.

Moreover, the glass substrate can be heated and cooled during conveyance of the glass substrate only by controlling the conveying speed of the roller device. There is no need to heat and cool in a stationary state as in the prior art. Therefore, the amount of foreign particles falling on the surface of the glass substrate before the coating procedure can be further reduced, and the coating yield of the glass substrate can be further improved.

In the description of the disclosure, terms such as "first" and "second" are merely for the purpose to distinguish one entity or operation from another entity or operation and cannot requiring or implying any actual relationship between the entities or operations or order. In addition, the term "include" and "comprise" and any variations thereof are meant to cover a non-exclusive inclusion. Such that the process, method, article or device including a series of elements includes not only those elements but also other elements not expressly listed or elements inherent to such process, method, article or device. Without further limitations, an element limited by the statement "including a . . . " does not exclude the existence of additional identical elements in the process, method, article, or apparatus that includes the element.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. An apparatus for drying and cooling a glass substrate, the apparatus comprising a baking oven and a cooling chamber arranged side by side, and the apparatus further comprising:
   a first roller device, installed on a bottom plate of the baking oven, used for moving the glass substrate in the baking oven;
   a second roller device, installed on a bottom plate of the cooling chamber, used for moving the glass substrate dried by the baking oven in the cooling chamber;
   a plurality of infrared heating plates, installed at inside of a top plate of the baking oven; and
   a plurality of cooling plates, installed at inside of a top plate of the cooling chamber;
   wherein both the top plate of the baking oven and the top plate of the cooling chamber are movable;
   wherein the top plate of the baking oven has a first free end near the cooling chamber, and the top plate of the cooling chamber has a second free end near the baking oven; the top plate of the baking oven and the top plate of the cooling chamber both are movable upwards in a manner of the first free end and the second free end being moved away from each other.

2. The apparatus according to claim 1, wherein the infrared heating plate is further installed on the bottom plate of the baking oven, and the cooling plate is further installed on the bottom plate of the cooling chamber.

3. The apparatus according to claim 2, wherein a passing channel for the glass substrate to pass through is respectively disposed in the baking oven beside of the cleaner, between the baking oven and the cooling chamber, and in the cooling chamber beside a coater.

4. The apparatus according to claim 3, wherein the surface of the first roller device, the surface of the second roller device, and a platform surface of the coater are at the same level.

5. An apparatus for drying and cooling a glass substrate, the apparatus comprising a baking oven and a cooling chamber arranged side by side, and the apparatus further comprising:
- a first roller device, installed on a bottom plate of the baking oven, used for moving the glass substrate in the baking oven;
- a second roller device, installed on a bottom plate of the cooling chamber, used for moving the glass substrate dried by the baking oven in the cooling chamber;
- a plurality of infrared heating plates, installed at inside of a top plate of the baking oven; and
- a plurality of cooling plates, installed at inside of a top plate of the cooling chamber;
- wherein the surface of the first roller device, the surface of the second roller device, and a platform surface of a coater are at the same level;
- wherein both the top plate of the baking oven and the top plate of the cooling chamber are movable;
- wherein the top plate of the baking oven has a first free end near the cooling chamber, and the top plate of the cooling chamber has a second free end near the baking oven; the top plate of the baking oven and the top plate of the cooling chamber both are movable upwards in a manner of the first free end and the second free end being moved away from each other.

6. The apparatus according to claim 5, wherein the infrared heating plate is further installed on the bottom plate of the baking oven; and the cooling plate is further installed on the bottom plate of the cooling chamber.

7. The apparatus according to claim 5, wherein a passing channel for the glass substrate to pass through is respectively disposed in the baking oven beside of the cleaner, between the baking oven and the cooling chamber, and in the cooling chamber beside the coater.

8. An apparatus for drying and cooling a glass substrate, the apparatus comprising a baking oven and a cooling chamber arranged side by side, and the apparatus further comprising:
- a first roller device, installed on a bottom plate of the baking oven, used for moving the glass substrate in the baking oven;
- a second roller device, installed on a bottom plate of the cooling chamber, used for moving the glass substrate dried by the baking oven in the cooling chamber;
- a plurality of infrared heating plates, installed at inside of a top plate of the baking oven; and
- a plurality of cooling plates, installed at inside of a top plate of the cooling chamber;
- wherein the top plate of the baking oven is capable of rotating around a first non-free end of the top plate of the baking oven away from the cooling chamber, and the plurality of infrared heating plates are movable upwards with the top plate of the baking oven; the top plate of the cooling chamber is capable of rotating around a second non-free end of the top plate of the cooling chamber away from the baking oven, and the plurality of cooling plates are movable upwards with the top plate of the cooling chamber.

\* \* \* \* \*